(12) United States Patent
Lin (10) Patent No.: US 10,261,551 B1
(45) Date of Patent: Apr. 16, 2019

(54) CASING

(71) Applicant: Wistron Corp., New Taipei (TW)

(72) Inventor: Fong Shan Lin, New Taipei (TW)

(73) Assignee: WISTRON CORP., New Taipei (TW)

( * ) Notice: Subject to any disclaimer, the term of this patent is extended or adjusted under 35 U.S.C. 154(b) by 0 days.

(21) Appl. No.: 16/056,962

(22) Filed: Aug. 7, 2018

(30) Foreign Application Priority Data

May 29, 2018 (TW) .............................. 107118223 A (51) Int. Cl.
*H05K 7/20* (2006.01)
*G06F 1/18* (2006.01)

(52) U.S. Cl.
CPC .............. *G06F 1/181* (2013.01); *G06F 1/183* (2013.01); *G06F 1/187* (2013.01)

(58) Field of Classification Search
CPC ..... G06F 1/1658; G06F 1/187; H05K 7/1474; H05K 7/1489
USPC ............ 361/679.33, 679.37, 679.38, 679.39; 312/223.2
See application file for complete search history.

(56) References Cited

U.S. PATENT DOCUMENTS

| | | | | |
|---|---|---|---|---|
| 6,781,827 B2* | 8/2004 | Goodman | ............... | G06F 1/184 248/27.1 |
| 8,087,739 B2* | 1/2012 | Chen | .................... | G11B 33/124 312/223.2 |
| 8,254,108 B2* | 8/2012 | Chang | ................ | H05K 7/20736 312/223.2 |
| 2012/0087080 A1* | 4/2012 | Wu | ......................... | G06F 1/187 361/679.33 |
| 2012/0218705 A1* | 8/2012 | Huang | .................... | G06F 1/187 361/679.37 |
| 2013/0099640 A1* | 4/2013 | Hu | ......................... | G06F 1/187 312/223.2 |

* cited by examiner

*Primary Examiner* — Anthony Q Edwards
(74) *Attorney, Agent, or Firm* — Locke Lord LLP; Tim Tingkang Xia, Esq.

(57) ABSTRACT

The disclosure provides a casing configured to accommodate an electronic device. The casing includes a case body, a first mounting plate, and a second mounting plate. The case body has an insertion hole which is adaptive for the electronic device to pass through. The first mounting plate is pivotally connected to the case body and located at a side of the insertion hole so as to be pivotable between a first covering position and a first mounting position. The second mounting plate is disposed in the case body and located at another side of the insertion hole. When the first mounting plate is in the first mounting position, the first mounting plate and the second mounting plate are configured to hold the electronic device together. When the first mounting plate is in the first covering position, the first mounting plate covers the insertion hole.

20 Claims, 13 Drawing Sheets

CASING

CROSS-REFERENCE TO RELATED APPLICATIONS

This non-provisional application claims priority under 35 U.S.C. § 119(a) on Patent Application No(s). 107118223 filed in R.O.C. Taiwan on May 29, 2018, the entire contents of which are hereby incorporated by reference.

TECHNICAL FIELD

The disclosure relates to a casing, more particularly to a casing which includes a pivotable mounting plate.

BACKGROUND

In recent years, as the modularization market of computer-related electronic components/devices becomes more mature, it is much easier for users to assemble a customized desktop computer according to their requirements, thereby resulting in more and more diverse assembly of the personal computer.

However, the existing desktop computers still have room for improvement. In the case of a desktop computer casing (also called casing), the casing is usually exclusively for a particular computer specification. If the user attempts to redesign the computer, he/she usually requires additional purchases of components. For example, a conventional desktop computer generally uses a box structure to accommodate and hold an optical disc drive (ODD), but when the optical disc drive and/or the box structure are removed due to some reasons, it will leave a through hole which was originally for holding the optical disc drive. As a result, the user needs to additionally purchase a dust cover to cover the through hole, or dust will enter into the casing via the through hole. But purchasing and mounting the dust cover increase the product and time costs. In addition, when the dust cover is not needed and removed, it is easily got lost due to careless storage.

SUMMARY

One embodiment of the disclosure provides a casing which configured to accommodate an electronic device. The casing includes a case body, a first mounting plate, and a second mounting plate. The case body has an insertion hole. The insertion hole is adaptive for the electronic device to pass through. The first mounting plate is pivotally connected to the case body and located at a side of the insertion hole so as to be pivotable between a first covering position and a first mounting position. The second mounting plate is disposed in the case body and located at another side of the insertion hole. When the first mounting plate is in the first mounting position, the first mounting plate and the second mounting plate are configured to hold the electronic device together. When the first mounting plate is in the first covering position, the first mounting plate covers the insertion hole.

BRIEF DESCRIPTION OF THE DRAWINGS

The present disclosure will become better understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known main structures and devices are schematically shown in order to simplify the drawing.

Moreover, the terms used in the present disclosure, such as technical and scientific terms, have its own meanings and can be comprehended by those skilled in the art, unless the terms are additionally defined in the present disclosure. That is, the terms used in the following paragraphs should be read on the meaning commonly used in the related fields and will not be overly explained unless the terms have a specific meaning in the present disclosure.

Figure 1:
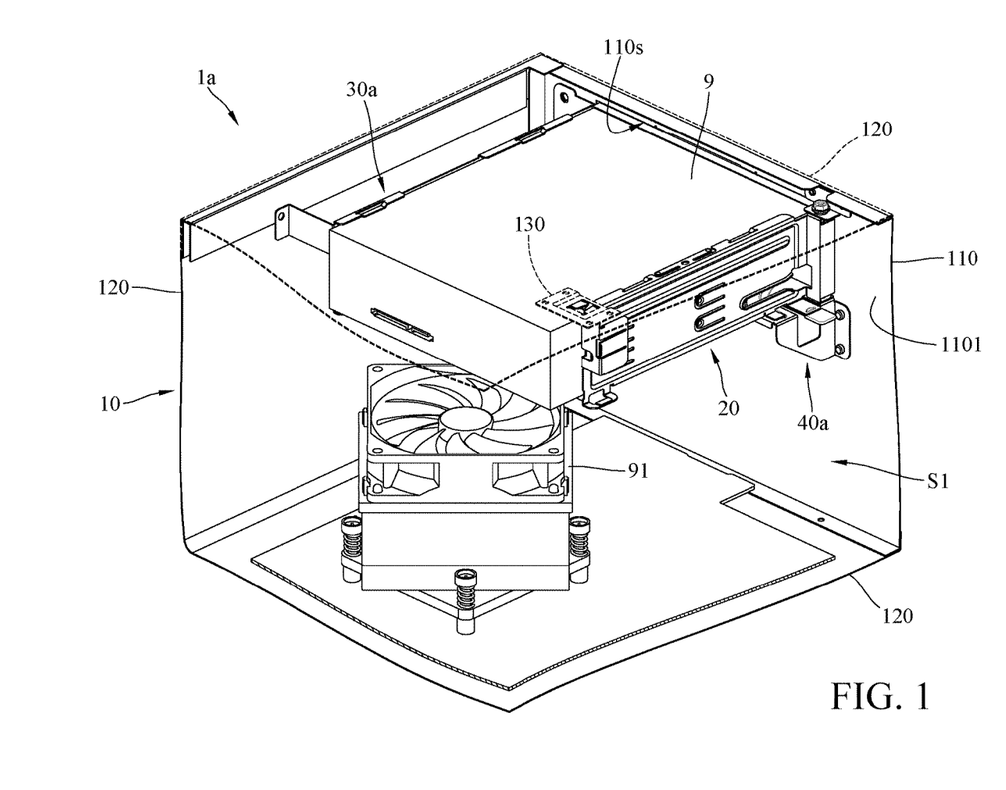
FIG. 1 is a perspective view of a casing wherein an electronic device is mounted therein according to a first embodiment of the present disclosure.
Figure 2:
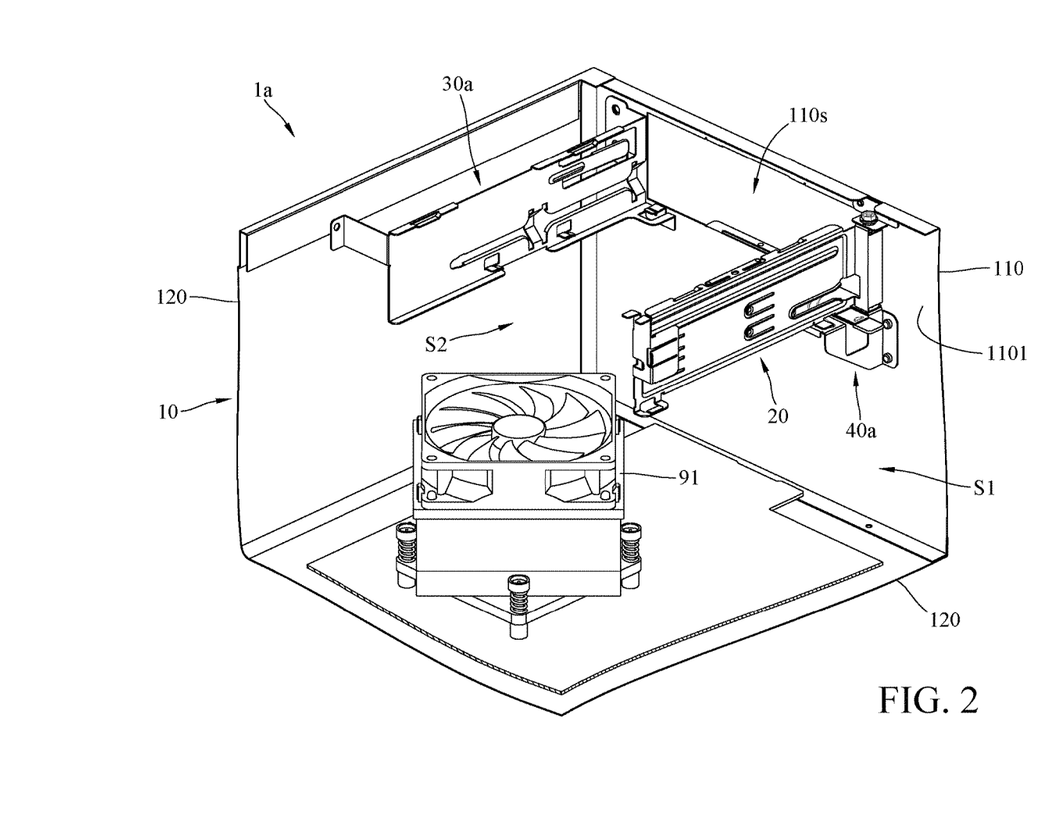
FIG. 2 is a perspective view of the casing in FIG. 1 wherein the electronic device and one of side panels are removed.
Figure 3:
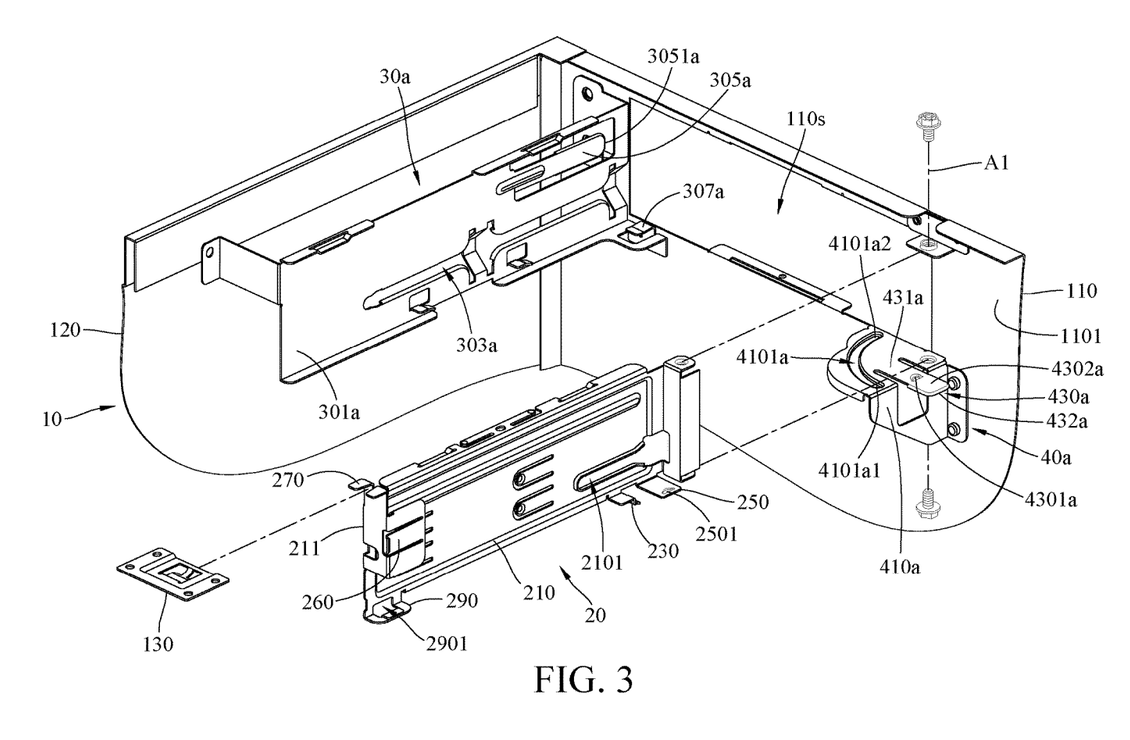
FIG. 3 is an exploded view of the casing in FIG. 1.

Firstly, please refer to FIGS. 1 to 3, FIG. 1 is a perspective view of a casing wherein an electronic device is mounted therein according to a first embodiment of the present disclosure, FIG. 2 is a perspective view of the casing in FIG. 1 wherein the electronic device and one of side panels are removed, and FIG. 3 is an exploded view of the casing in FIG. 1

This embodiment provides a casing 1a. The casing 1a is able to accommodate an electronic device 9. The casing 1a is, for example, a computer casing or a server casing. The electronic device 9 is, for example, an optical disc drive (ODD), and it would be referred as the optical disc drive 9 hereinafter for the convenience of explanation.

In this embodiment, the casing 1a includes a case body 10, a first mounting plate 20, a second mounting plate 30a, and a first guiding member 40a.

The case body 10 includes a front panel 110, a plurality of side panels 120 and a fixing piece 130. The side panels 120 are respectively connected to different sides of the front panel 110 so that the side panels 120 and the front panel 110 together form an inner space S1 therebetween. The front panel 110 has an insertion hole (in this embodiment, it also can be referred as an optical disc drive slot) which is connected to the inner space S1. The insertion hole 110s allows the optical disc drive 9 to pass through so that the optical disc drive 9 can be inserted into or removed from the inner space S1 via the insertion hole 110s. It is understood that there are various other electronic components/devices such as a fan 91 in the inner space S1, but the present disclosure is not limited thereto.

In addition, in this or other embodiments, one of the side panels 120 is detachable. Detaching the detachable side panel 120 will expose the inner space S1 and thus allows user or maintenance personnel to reach the electronic components/devices or others in the inner space S1. The fixing piece 130 is fixed on an inner surface of the detachable side panel 120.

The first mounting plate 20 includes a first main plate 210, a first protruding portion 230, a first tab 250, a press arm 260, a first extension structure 270, and a first bent portion 290.

The first main plate 210 is pivotally connected to an inner surface 1101 of the front panel 110 and is pivotable about an axis A1, and the first main plate 210 is located at a sided of the insertion hole 110s. In this embodiment, the first main plate 210 is able to be pivoted with respect to the insertion hole 110s so that the first mounting plate is pivotable between a first covering position and a first mounting position. However, the location of the first main plate 210 is not restricted. For example, in some other embodiments, the first main plate 210 may be pivotally connected to an outer surface of the front panel 110 or pivotally connected to an edge which forms the insertion hole 110s. In addition, there may be a torsion spring (not shown) disposed on the axis A1 for continuously forcing the first mounting plate 20 to pivot toward the first covering position. Furthermore, the first main plate 210 further has a first mounting surface 211 and a first mount structure 2101 formed on the first mounting surface 211. In this embodiment, the first mount structure 2101 is a groove which is configured for the optical disc drive 9 to be mounted thereto.

Both the first protruding portion 230 and the first tab 250 protrude from a side of the first main plate 210 and are located closer to the axis A1. In more detail, part of the first protruding portion 230 extends away from the detachable side panel 120, and the first tab 250 is substantially perpendicular to the first main plate 210 and has a first positioning hole 2501.

The press arm 260 is located at a side of the first main plate 210 away from the axis A1. The press arm 260 can be deformed when a certain amount of force is applied thereon but will return to its original state when the force is canceled.

Both the first extension structure 270 and the first bent portion 290 protrude from a side of the first main plate 210 away from the axis A1. In more detail, the first extension structure 270 is located at a corner of the first main plate 210 which is close to the detachable side panel 120, and the first bent portion 290 is located at another corner of the first main plate 210 which is located opposite to the first extension structure 270.

In this embodiment, the second mounting plate 30a is immovably fixed on one of the side panels 120 of the case body 10 and located at another side of the insertion hole 110s so as to be located opposite to the first mounting plate 20. In detail, the second mounting plate 30a has a second mounting surface 301a, a second mount structure 303a, an elastic arm 305a and a hook structure 307a. The second mount structure 303a is a groove which is configured for the optical disc drive 9 to be mounted thereto. The elastic arm 305a is located at a side of the second mounting plate 30a close to the insertion hole 110s. The elastic arm 305a can be deformed when a certain amount of force is applied thereon but will return to its original state when the force is canceled. In addition, the elastic arm 305a has a holding end 3051a. The hook structure 307a is also located at the side of the second mounting plate 30a close to the insertion hole 110s. The hook structure 307a and the second mounting surface 301a are respectively located at different sides of the insertion hole 110s. The hook structure 307a extends toward the inner space S1; that is, the hook structure 307a extends away from the insertion hole 110s and extends toward the interior of the casing 1a.

The first guiding member 40a includes a first guiding body 410a and a first release portion 430a. The first guiding body 410a is disposed on the inner surface 1101 of the front panel 110 and is located close to the side of the first mounting plate 20 in which the first protruding portion 230 and the first tab 250 are disposed at. In detail, the first guiding body 410a has a first arc-shaped guide groove 4101a. The part of the first protruding portion 230 of the first mounting plate 20 is slidably located in the first arc-shaped guide groove 4101a, and the first tab 250 is able to be moved along a surface of the first guiding body 410a. In more detail, the first arc-shaped guide groove 4101a has a first stopping end 4101a1 and a second stopping end 4101a2 which are located opposite to each other. The first stopping end 4101a1 and the second stopping end 4101a2 are configured to stop the movement of the first protruding portion 230 so as to respectively stop the first mounting plate 20 in the first covering position and the first mounting position.

The first release portion 430a has a first protruding structure 4301a, a first press portion 4302a, a first fixed side 431a and a first free side 432a. The first fixed side 431a and the first free side 432a are located opposite to each other. The first fixed side 431a is connected to the first guiding body 410a. The first protruding structure 4301a protrudes from the surface of the first guiding body 410a in which the first mounting plate 20 is disposed on, and the first protruding structure 4301a is configured to penetrate through the first positioning hole 2501 of the first tab 250 when the first tab 250 is moved to its top side. The first press portion 4302a is located closer to the first free side 432a than the first protruding structure 4301a, and the first press portion 4302a is located between the first protruding structure 4301a and the first free side 432a. The first release portion 430a can be deformed when a certain amount of force is applied on the first press portion 4302a so as to move the first protruding structure 4301a out of the first positioning hole 2501 of the first tab 250. It is understood that the first release portion 430a will return to its original state when the force is canceled.

FIGS. 1 and 2 show that the first mounting plate 20 is in the first mounting position. At this moment, the first mounting plate 20, the second mounting plate 30a and the inner surface 1101 of the front panel 110 together form an accommodating space S2 connected to the insertion hole 110s. The optical disc drive 9 can be inserted into the accommodating space S2 via the insertion hole 110s. During the insertion of the optical disc drive 9, two opposite sides of the optical disc drive 9 are respectively sliding in the first mount structure 2101 of the first mounting plate 20 and the second mount structure 303a of the second mounting plate 30a so that the optical disc drive 9 can be slid along the first mounting plate 20 and the second mounting plate 30a and moved to the desired position. That is, when the first mounting plate 20 is in the first mounting position, the first mounting plate 20 and the second mounting plate 30a can together hold the optical disc drive 9 in position.

When the first mounting plate 20 is in the first mounting position, the first protruding structure 4301a of the first guiding member 40a penetrates through the first positioning hole 2501 of the first tab 250 so as to secure the first mounting plate 20 in the first mounting position. Also, when the first mounting plate 20 is in the first mounting position, the first extension structure 270 of the first mounting plate 20 can be engaged into the fixing piece 130 on the side panel 120, thereby further securing the first mounting plate 20 in the first mounting position.

Figure 4:
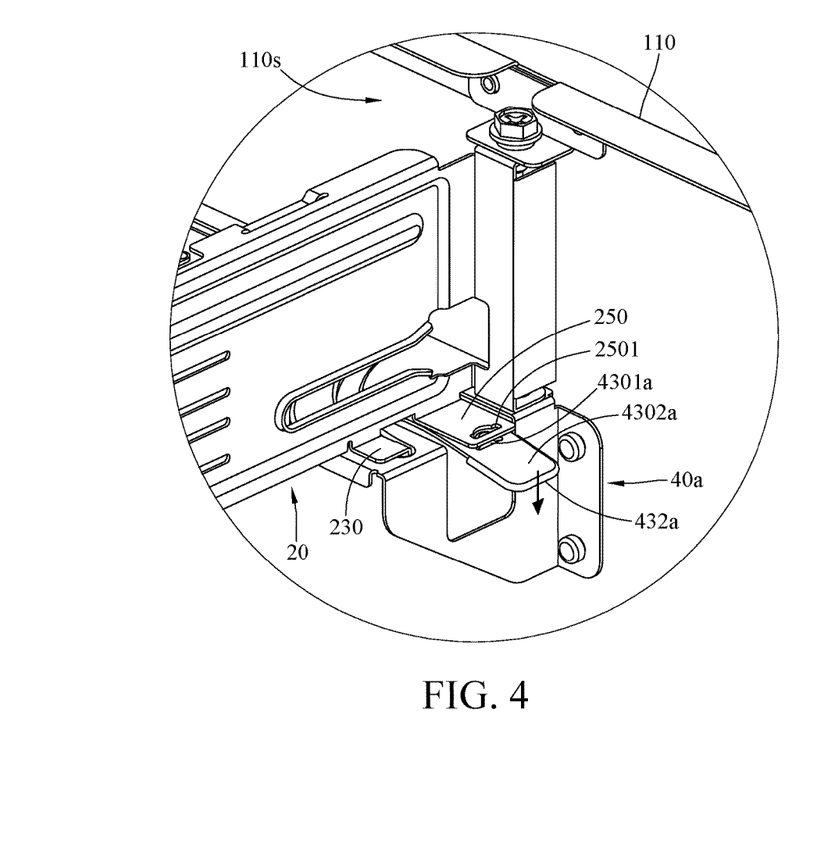
FIG. 4 is a partially enlarged view of the casing in FIG. 1 when a first press portion is pressed down.
Figure 5:
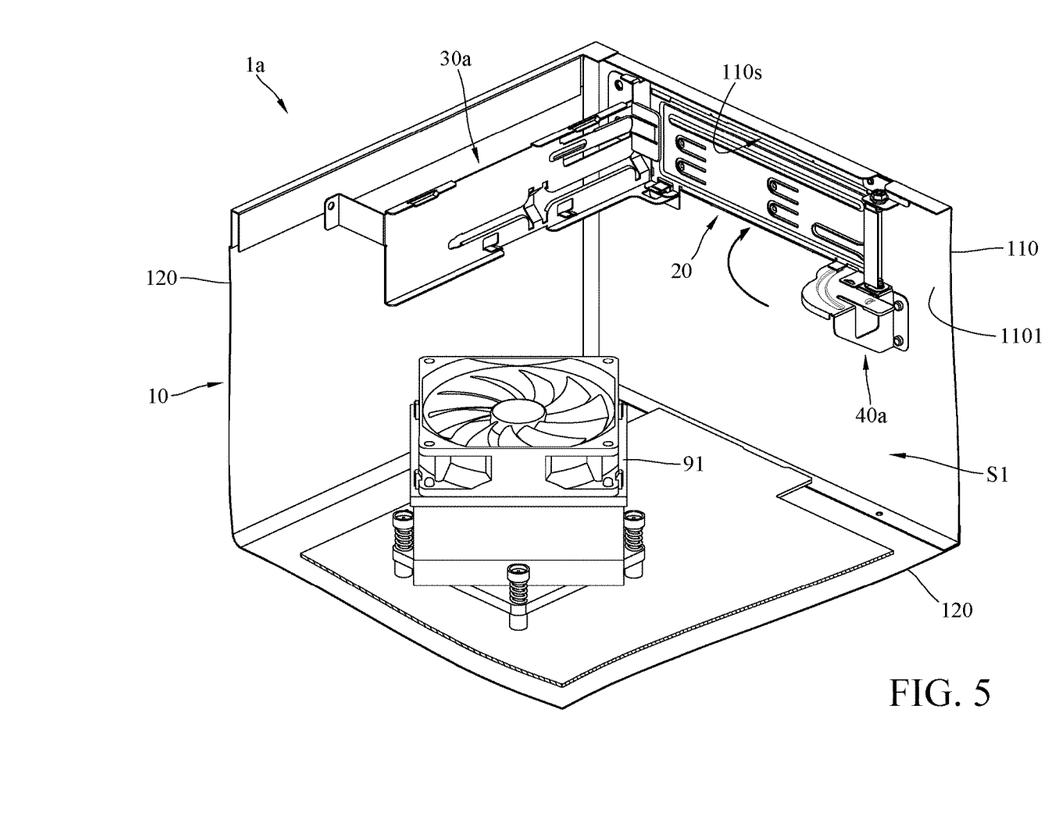
FIG. 5 is a perspective view of the casing in FIG. 1 showing that a first mounting plate is moved from a first mounting position to a first covering position.
Figure 6:
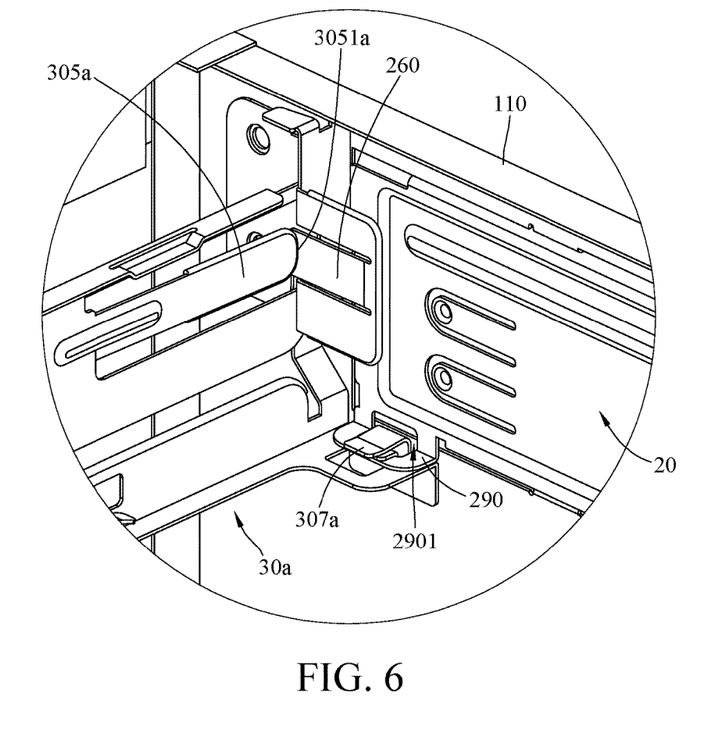
FIG. 6 is a partially enlarged view of the casing in FIG. 5.

Then, please refer to FIGS. 4 to 6, FIG. 4 is a partially enlarged view of the casing in FIG. 1 when a first press portion is pressed down, FIG. 5 is a perspective view of the casing in FIG. 1 showing that a first mounting plate is moved from a first mounting position to a first covering position, and FIG. 6 is a partially enlarged view of the casing in FIG. 5.

After removing the aforementioned detachable side panel 120 to cancel the engagement between the first extension structure 270 and the fixing piece 130, the optical disc drive 9 then can be removed.

As shown in FIG. 4, after the optical disc drive 9 was removed from the casing 1a, the engagement between the first protruding structure 4301a and the first positioning hole 2501 can be canceled by pressing down the first press portion 4302a of the first guiding member 40a to slightly deform the first release portion 430a.

Then, as shown in FIG. 5, the first main plate 210 is pivoted toward the first covering position to cover the insertion hole 110s by being driven by the aforementioned torsion spring, thereby automatically achieving a dustproof effect.

It is noted that, as shown in FIG. 6, when first mounting plate 20 is in the first covering position, an end of the press arm 260 of the first mounting plate 20 which is away from the axis A1 is held between the second mounting plate 30a and the insertion hole 110s by the holding end 3051a of the elastic arm 305a of the second mounting plate 30a, such that the first mounting plate 20 is fixed in the first covering position. In addition, the hook structure 307a of the second mounting plate 30a is hooked into a first hook hole 2901 of the first bent portion 290 of the first mounting plate 20 when the first main plate 210 is moved to the first covering position, thereby further fixing the first mounting plate 20 in the first mounting position.

On the contrary, the limitation of the press arm 260 of the first mounting plate 20 caused by the holding end 3051a can be canceled by pressing the elastic arm 305a of the second mounting plate 30a, and then the first mounting plate 20 will be pivoted back to the first mounting position.

In short, when it attempts to install the optical disc drive 9 into the casing 1a, the environment suitable for holding the optical disc drive 9 would be completed by pivoting the first mounting plate 20 to the first mounting position. On the other hand, when the optical disc drive 9 is removed, the first mounting plate 20 can be pivoted to the first covering position to cover the insertion hole 110s so as to prevent dust from entering into the casing 1a. Moreover, when the first mounting plate 20 is in the first covering position, it does not occupy the inner space S1 of the case body 10 so as to create a larger and one whole space for other possible applications.

For example, the space for the airflow generated by the fan 91 to flow is increased and becomes more of a one whole space and thus helps to improve the heat convection efficiency inside the casing 1a; alternatively, the inner space S1 can be used to accommodate or install other electronic devices/components. Regarding the latter case, in this or other embodiments, when the first mounting plate 20 is in the first covering position, the surfaces of the first mounting plate 20 and the second mounting plate 30a facing the inner space S1 may have one or more other mount structures (e.g., screw holes, mount holes or mount structures such as metal plates, etc.) which are compatible with the other electronic devices/components that may be mounted thereon or are used for cables arrangement. Therefore, the casing 1a can meet various requirements for assembling a computer.

Figure 7:
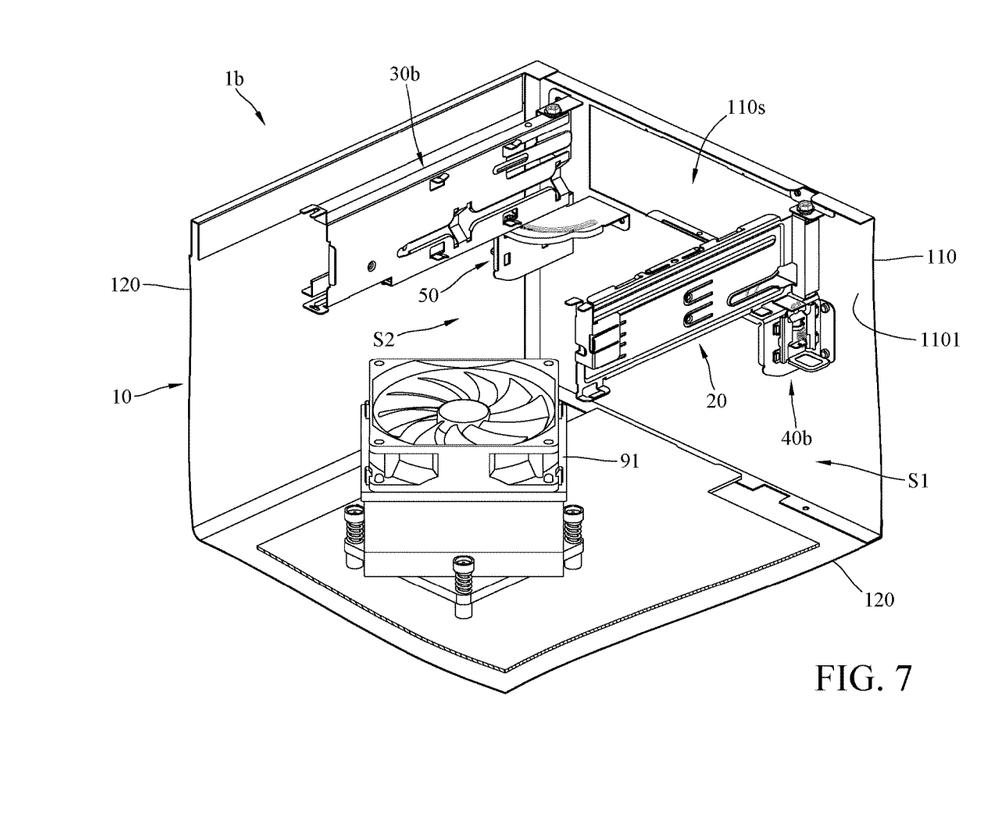
FIG. 7 is a perspective view of a casing according to a second embodiment of the present disclosure.
Figure 8:
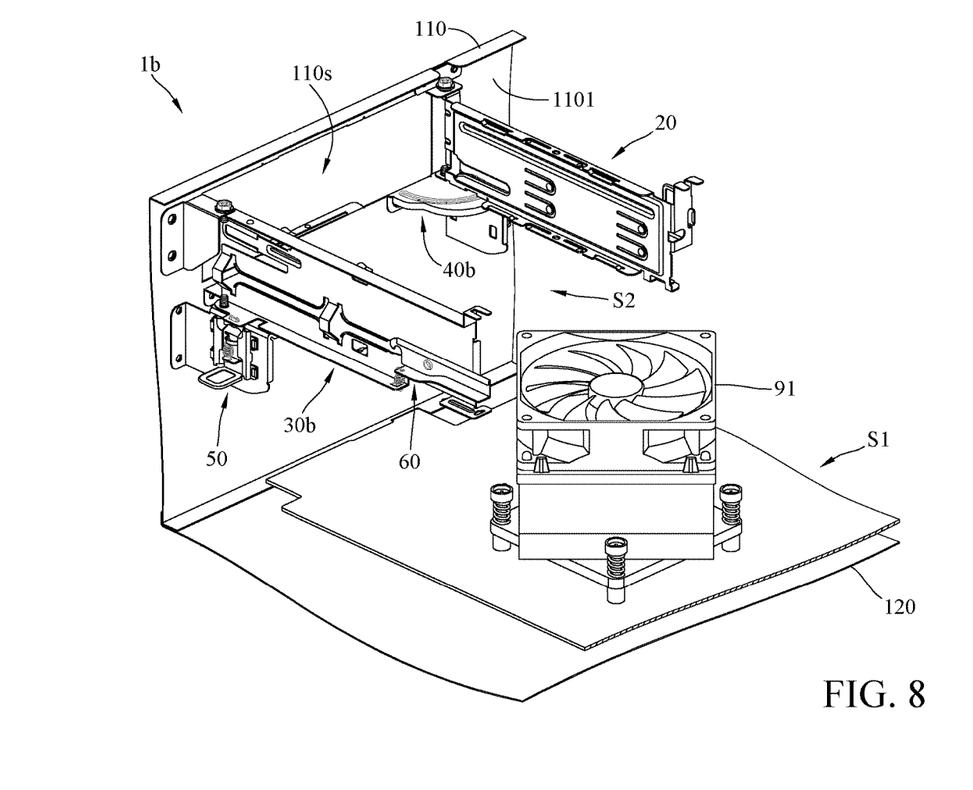
FIG. 8 is another perspective view of the casing in FIG. 7.
Figure 9:
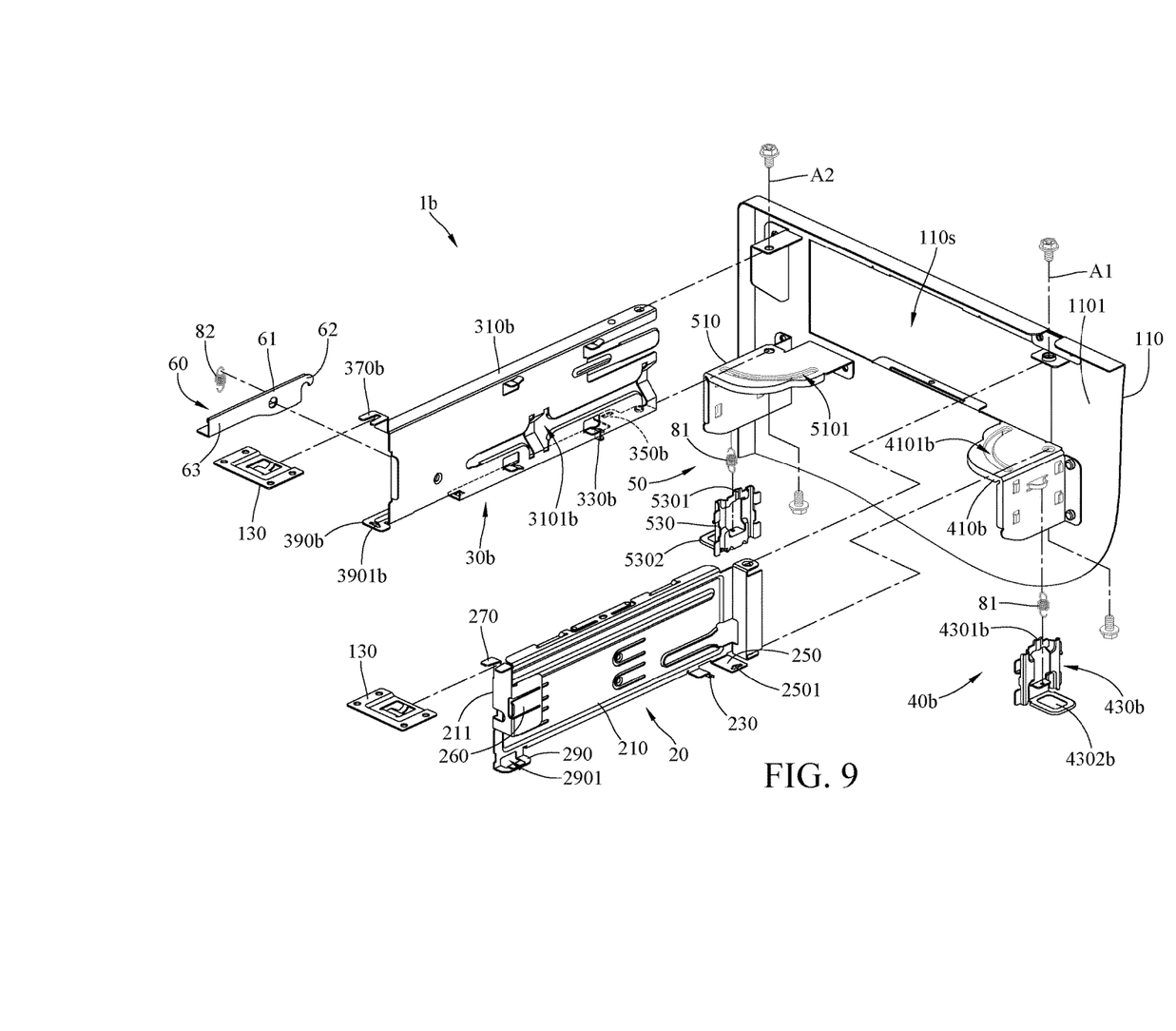
FIG. 9 is an exploded view of the casing in FIG. 7.

However, the present disclosure is not limited to the previous embodiment. For example, please refer to FIGS. 7 to 9, FIG. 7 is a perspective view of a casing according to a second embodiment of the present disclosure, FIG. 8 is another perspective view of the casing in FIG. 7, and FIG. 9 is an exploded view of the casing in FIG. 7. The differences between the second embodiment and the previous embodiment are that the configuration of the first guiding member and the second mounting plate in the second embodiment is pivotable.

In detail, the second embodiment provides a casing 1b which includes the case body 10, the first mounting plate 20, a second mounting plate 30b, a first guiding member 40b and a second guiding member 50. It should be noted that the first mounting plate 20 of the second embodiment is the same as that in the previous embodiment, and the there are two fixing pieces 130 on the detachable side panel 120 of the second embodiment, and thus the descriptions of the first mounting plate 20 and the case body 10 will not be repeated hereinafter. The followings mainly describe the second mounting plate 30b, the first guiding member 40b, and the second guiding member 50.

In this embodiment, the first guiding member 40b includes a first guiding body 410b and a first fixing component 430b. The first guiding body 410b disposed on the inner surface 1101 of the front panel 110. The location of the first guiding body 410b is the same as the first guiding body 410a in the first embodiment. The first guiding body 410b also has a first arc-shaped guide groove 4101b for the first protruding portion 230 of the first mounting plate 20 to be slid therein.

The first fixing component 430b is slidably disposed on a side of the first guiding body 410b. In addition, there is a first extension spring 81 connected to and located between the first fixing component 430b and the first guiding body 410b. The first extension spring 81 normally pulls the first fixing component 430b toward the first mounting plate 20.

Furthermore, the first fixing component 430b has a first protruding structure 4301b and a first press portion 4302b. The first protruding structure 4301b normally sticks out from the top surface of the first guiding body 410b since the first fixing component 430b is normally pulled by the first extension spring 81. Thus, the first fixing component 430b is able to penetrate through the first positioning hole 2501 of the first tab 250 when the first mounting plate 20 is in the first mounting position. The first press portion 4302b is substantially perpendicular to a sliding direction of the first fixing component 430b and can be pressed down in a direction away from the first mounting plate 20. Pressing down the first press portion 4302b is able to move the first protruding structure 4301b out of the first positioning hole 2501.

The second guiding member 50 is disposed on another side of the insertion hole 110s which is located opposite to the first guiding member 40b. The second guiding member 50 includes a second guiding body 510 and a second fixing component 530 which is slidably disposed on a side of the second guiding body 510. The second guiding body 510 has a second arc-shaped guide groove 5101, and the second fixing component 530 has a second protruding structure 5301 and a second press portion 5302. As shown in figures, the second guiding member 50 and the aforementioned first guiding member 40b are substantially mirror symmetries and thus the similar descriptions will not be repeated hereinafter.

In this embodiment, the second mounting plate 30b is pivotable. The second mounting plate 30b includes a second main plate 310b, a second protruding portion 330b, a second tab 350b, a second extension structure 370b and a second bent portion 390b. Since the second mounting plate 30b and the first mounting plate 20 are similar in configuration and thus the following detail descriptions are only made for the differences therebetween.

The second main plate 310b of the second mounting plate 30b is pivotally connected to an inner surface 1101 of the front panel 110 and is pivotable about an axis A2. In this embodiment, the second main plate 310b is located at another side of the insertion hole 110s and is able to be pivoted with respect to the insertion hole 110s so that the second mounting plate 30b is pivotable between a second covering position and a second mounting position. In addition, there may be another torsion spring (not shown) disposed on the axis A2 for continuously forcing the second mounting plate 30b to pivot toward the second covering position. Furthermore, the second main plate 310b has a second mounting surface 311b and a second mount structure 3101b formed on the second mounting surface 311b. The second protruding portion 330b is slidably located in the second arc-shaped guide groove 5101 of the second guiding member 50. The second tab 350b has a second positioning hole 3501b. The second protruding structure 5301 of the second guiding member 50 is configured to penetrate through the second positioning hole 3501b of the second tab 350b when the second mounting plate 30b is moved to the second mounting position. Also, the second extension structure 370b can be engaged into the fixing piece 130 on the detachable side panel 120 when the second mounting plate 30b is in the second mounting position. The second bent portion 390b is substantially perpendicular to the second main plate 310b and protrudes from an edge of the second main plate 310b, and the protruding part of the second bent portion 390b has a second hook hole 3901b.

In addition, in this embodiment, the casing 1b further includes a releasing member 60 which is disposed at a side of the second mounting plate 30b which is located opposite to the second mounting surface 311b. In detail, the releasing member 60 includes a pivot part 61, a fixing part 62 and a press part 63. The pivot part 61 is connected to and located between the fixing part 62 and the press part 63. The pivot part 61 is pivoted to a side of the second main plate 310b of the second mounting plate 30b which is located opposite to the second mounting surface 311b. The fixing part 62 is exposed from the second mount structure 3101b. When the optical disc drive 9 is installed to the end of the second mount structure 3101b, and the fixing part 62 is able to fix the optical disc drive 9 in position. The press part 63 protrudes from the second main plate 310b and is configured to be pressed by a user in order to lift the fixing part 62. In addition, there is a second extension spring 82 which is connected to and located between the fixing part 62 of the releasing member 60 and the second bent portion 390b of the second mounting plate 30b. The second extension spring 82 is configured to continuously pull the fixing part 62 toward the second bent portion 390b.

Similarly, please refer back to FIGS. 7 and 8, showing that the first mounting plate 20 is in the first mounting position and the second mounting plate 30b is in the second mounting position. At this moment, the optical disc drive 9 can be inserted into the case body 10 via the insertion hole 110s. During the insertion of the optical disc drive 9, two opposite sides of the optical disc drive 9 are respectively sliding in the first mount structure 2101 of the first mounting plate 20 and the second mount structure 3101b of the second mounting plate 30b. When the optical disc drive 9 is slid to the desired position, it can be fixed by the fixing part 62 of the releasing member 60.

Also, the first protruding structure 4301b of the first guiding member 40b penetrates through the first positioning hole 2501 of the first mounting plate 20, and the first protruding structure 5301 of the second guiding member 50 penetrates through the second positioning hole 3501b of the second mounting plate 30b, such that the first mounting plate 20 is fixed in the first mounting position and the second mounting plate 30b is fixed in the second mounting position. Furthermore, the first extension structure 270 of the first mounting plate 20 and the second extension structure 370b of the second mounting plate 30b are respectively engaged into the two fixing pieces 130 on the side panel 120, thereby further fixing the first mounting plate 20 in the first mounting position and the second mounting plate 30b in the second mounting position.

Figure 10:
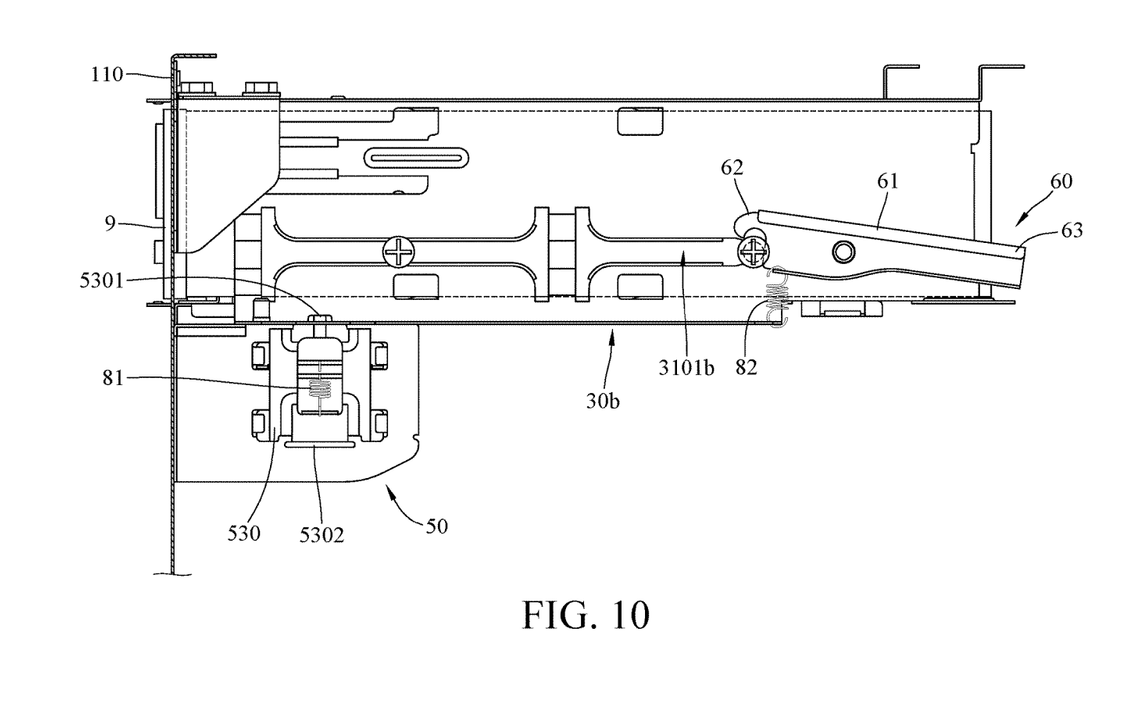
FIG. 10 is a partially enlarged side view of the casing in FIG. 7 showing that operating a releasing member allows the electronic device to be removed from the casing.
Figure 11:
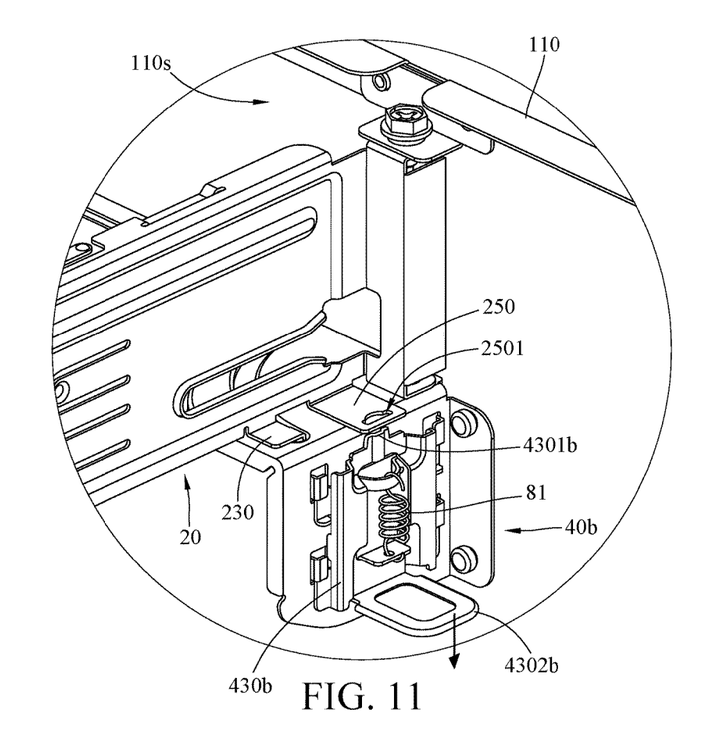
FIG. 11 is a partially enlarged view of the casing in FIG. 7 when a first fixing component is pressed down.

The engagements between the mounting plates and the fixing pieces 130 can be canceled by removing the detachable side panel 120. Then, as shown in FIG. 10, the press part 63 of the releasing member 60 is pressed down and thus the fixing part 62 is lifted so that the fixing part 62 is disengaged from the optical disc drive 9. At this moment, the optical disc drive 9 can be removed from the insertion hole 110s. Then, please refer to FIGS. 11 to 13 to describe the operation after removing the optical disc drive 9. FIG. 11 is a partially enlarged view of the casing in FIG. 7 when a first fixing component is pressed down, FIG. 12 is a perspective view of the casing in FIG. 7 showing that a first mounting plate is moved from a first mounting position to a first covering position, and FIG. 13 is a perspective view of the casing in FIG. 7 showing that a second mounting plate is moved from a second mounting position to a second covering position.

As shown in FIG. 11, after the optical disc drive 9 and the side panel 120 were removed, the first protruding structure 4301b of the first fixing component 430b can be removed from the first positioning hole 2501 of the first mounting plate 20 by pressing down the first press portion 4302b of the first guiding member 40b.

Figure 12:
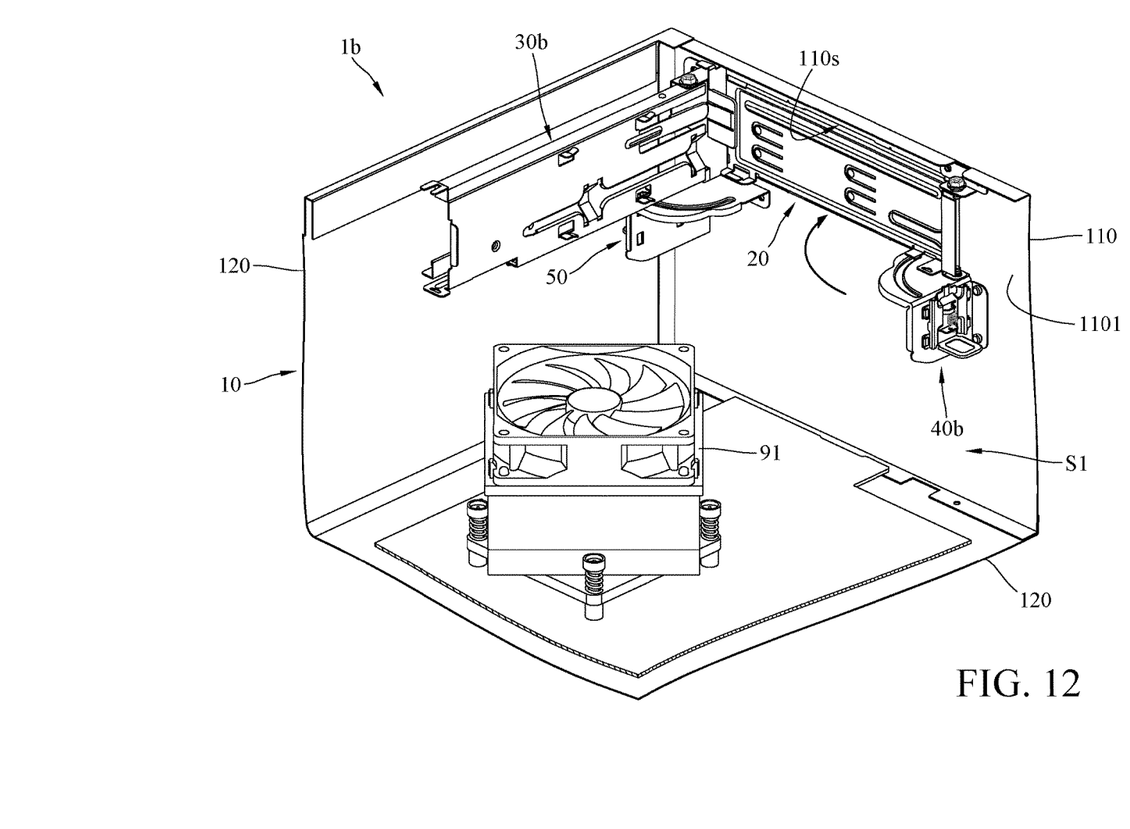
FIG. 12 is a perspective view of the casing in FIG. 7 showing that a first mounting plate is moved from a first mounting position to a first covering position.
Figure 13:
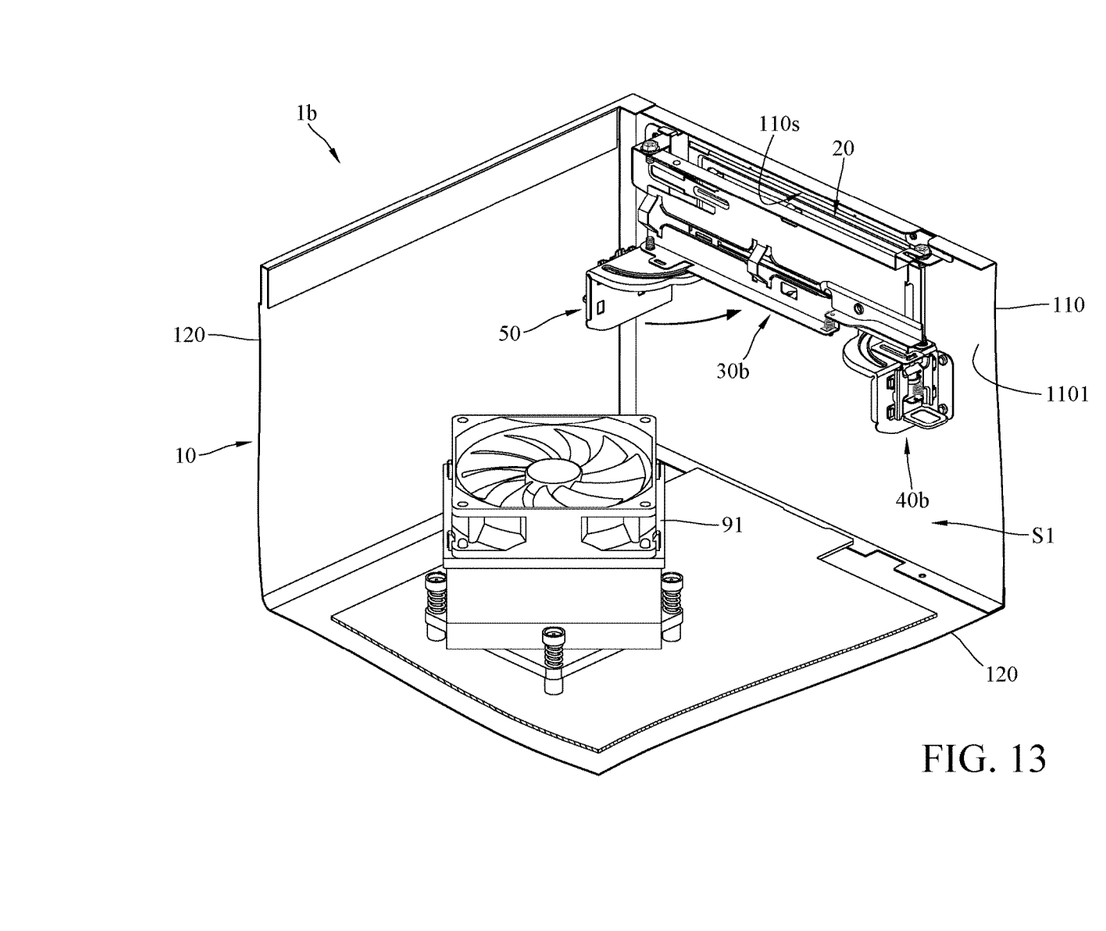
FIG. 13 is a perspective view of the casing in FIG. 7 showing that a second mounting plate is moved from a second mounting position to a second covering position.

Then, as shown in FIG. 12, the first mounting plate 20 is pivoted toward the first covering position to cover the insertion hole 110s by being driven by the torsion spring located at the axis A1, thereby automatically achieving a dustproof effect.

Then, the limitation of the second mounting plate 30b caused by the second guiding member 50 can be canceled by pressing down the second press portion 5302 of the second guiding member 50, and then the second mounting plate 30b is pivoted toward the second covering position to be stacked on the first mounting plate 20 by being driven by the torsion spring located at the axis A2. In addition, when the second mounting plate 30b is moved to the covering position and stacked on the first mounting plate 20, the user can operate the first fixing component 430b of the first guiding member 40b and let the first protruding structure 4301b to penetrate through the second hook hole 3901b on the second bent portion 390b of the second mounting plate 30b, thereby securing the second mounting plate 30b in the second covering position.

On the contrary, by pressing down the first press portion 4302b of the first fixing component 430b to remove the first protruding structure 4301b out of the first positioning hole 2501, the first mounting plate 20 and the second mounting plate 30b will be sequentially pivoted back to the mounting positions.

In short, when it attempts to install the optical disc drive 9 into the casing 1b, the environment suitable for holding the optical disc drive 9 would be completed by pivoting the first mounting plate 20 and the second mounting plate 30b to the mounting positions. On the other hand, when the optical disc drive 9 is removed, the first mounting plate 20 and the second mounting plate 30b can be pivoted to the covering positions to cover the insertion hole 110s so as to prevent dust from entering into the casing 1b.

Moreover, when both the first mounting plate 20 and the second mounting plate 30b are in the covering positions, they do not occupy the inner space S1 of the case body 10 so as to create a larger and one whole space for other possible applications. For example, the space for the airflow generated by the fan 91 to flow is increased and becomes more of a one whole space and thus helps to improve the heat convection efficiency inside the casing 1b; alternatively, the inner space S1 can be used to accommodate or install other electronic devices/components. Regarding the latter case, in this or other embodiments, when the second mounting plate 30b is in the second covering position, the surface of the second mounting plate 30b facing the inner space S1 may have one or more other mount structures (e.g., screw holes, mount holes or mount structures such as metal plates, etc.) which are compatible with the other electronic devices/components that will be mounted thereon or are used for cables arrangement. Therefore, the casing 1b can also meet various requirements for assembling a computer According to the casing as discussed in above, the first mounting plate is pivotally connected to the case body so as to be pivotable between the first covering position and the first mounting position with respect to the insertion hole, thus the casing is able to hold the electronic device in position by the cooperation of the first mounting plate and the second mounting plate. In addition, when the electronic device is removed, the first mounting plate can be pivoted to the first covering position to cover the insertion hole, thereby preventing dust from entering into the casing. Therefore, the casing of the present disclosure can meet various requirements for assembling a computer and can avoid purchasing extra component to increase unnecessary costs.

It will be apparent to those skilled in the art that various modifications and variations can be made to the present disclosure. It is intended that the specification and examples be considered as exemplary embodiments only, with a scope of the disclosure being indicated by the following claims and their equivalents.

What is claimed is:

1. A casing, adapted to accommodate an electronic device, comprising:
   a case body, having an insertion hole, wherein the insertion hole is adaptive for the electronic device to pass through;
   a first mounting plate, pivotally connected to the case body and located at a side of the insertion hole so as to be pivotable between a first covering position and a first mounting position; and
   a second mounting plate, disposed in the case body and located at another side of the insertion hole;
   wherein when the first mounting plate is in the first mounting position, the first mounting plate and the second mounting plate are configured to hold the electronic device together; when the first mounting plate is in the first covering position, the first mounting plate covers the insertion hole.

2. The casing according to claim 1, wherein the first mounting plate has at least one first mount structure, the second mounting plate has at least one second mount structure; when the first mounting plate is in the first mounting position, two opposite sides of the electronic device are configured to be respectively mounted on the at least one first mount structure of the first mounting plate and the at least one second mount structure of the second mounting plate so as to be held by the first mounting plate and the second mounting plate.

3. The casing according to claim 1, wherein the second mounting plate has a holding end; when the first mounting plate is in the first covering position, a side of the first mounting plate away from a first axis of the first mounting plate is held by the holding end so as to be fixed between the second mounting plate and the insertion hole.

4. The casing according to claim 1, wherein the first mounting plate has a first hook hole and a first axis, the first mounting plate is pivotally connected to the case body and pivotable about the first axis, the first hook hole is located at a side of the first mounting plate away from the first axis, the second mounting plate has a hook structure; when the first mounting plate is in the first covering position, the hook structure is hooked in the first hook hole so as to hold the first mounting plate in the first covering position.

5. The casing according to claim 4, wherein the hook structure is located at a side of the second mounting plate and extends away from the insertion hole.

6. The casing according to claim 1, further comprising a first guiding member, the first guiding member disposed in the case body; wherein the first guiding member has a first arc-shaped guide groove, the first mounting plate comprises a first main plate and a first protruding portion, and the first protruding portion protrudes from a side of the first main plate and is slidably located in the first arc-shaped guide groove.

7. The casing according to claim 6, wherein the first guiding member comprises a first guiding body and a first release portion connected to each other, the first release portion has a first protruding structure, the first mounting plate further has a first tab, the first tab is connected to the first main plate and has a first positioning hole; when the first mounting plate is in the first mounting position, the first protruding structure penetrates through the first positioning hole so as to secure the first mounting plate in the first mounting position.

8. The casing according to claim 7, wherein the second mounting plate is pivotally connected to the case body and pivotable about a second axis so as to be pivotable between a second covering position and a second mounting position, and the second mounting plate has a second hook hole which is located at a side of the second mounting plate away from the second axis; when the first mounting plate is in the first covering position and the second mounting plate is in the second covering position, the first mounting plate covers the insertion hole, the second mounting plate is stacked on the first mounting plate, and the first protruding structure penetrates through the second hook hole of the second mounting plate so as to secure the second mounting plate in the second covering position.

9. The casing according to claim 8, further comprising a second guiding member, the second guiding member disposed in the case body, wherein the second guiding member has a second arc-shaped guide groove, the second mounting plate comprises a second main plate and a second protruding portion, and the second protruding portion protrudes from a side of the second main plate and is slidably located in the second arc-shaped guide groove.

10. The casing according to claim 6, wherein the first arc-shaped guide groove has a first stopping end and a second stopping end which are respectively configured to stop the first mounting plate in the first mounting position and the first covering position.

11. The casing according to claim 7, wherein the first release portion has a first press portion, a first fixed side and a first free side, the first fixed side is connected to the first guiding body, and the first press portion is located between the first protruding structure and the first free side.

12. The casing according to claim 6, wherein the first guiding member comprises a first guiding body and a first fixing component, the first fixing component is slidably disposed on a side of the first guiding body, the first mounting plate further comprises a first tab, the first tab is connected to a side of the first main plate and has a first positioning hole; when the first mounting plate is in the first mounting position, an end of the first fixing component is in the first positioning hole so as to secure the first mounting plate in the first mounting position.

13. The casing according to claim 12, wherein the first fixing component has a first press portion which is substantially perpendicular to a sliding direction of the first fixing component.

14. The casing according to claim 12, further comprising an extension spring which is connected to and located between the first guiding body and the first fixing component, and the extension spring is configured to continuously pull the end of the first fixing component toward the first mounting plate.

15. The casing according to claim 12, wherein the second mounting plate is pivotally connected to the case body and pivotable about a second axis so as to be pivotable between a second covering position and a second mounting position, and the second mounting plate has a second hook hole which is located at a side of the second mounting plate away from the second axis; when the first mounting plate is in the first covering position and the second mounting plate is in the second covering position, the first mounting plate covers the insertion hole, the second mounting plate is stacked on the first mounting plate, and the end of the first fixing component penetrates through the second hook hole of the second mounting plate so as to secure the second mounting plate in the second covering position.

16. The casing according to claim 9, wherein the second guiding member comprises a second guiding body and a second release portion connected to each other, the second release portion has a second protruding structure, the second mounting plate further comprises a second tab, the second tab is connected to a side of the second main plate and has a second positioning hole; when the second mounting plate is in the second mounting position, the second protruding structure penetrates through the second positioning hole so as to secure the second mounting plate in the second mounting position.

17. The casing according to claim 2, wherein the at least one first mount structure and the at least one second mount structure are grooves which are configured for holding the electronic device and guiding the electronic device to be installed into the case body.

18. The casing according to claim 1, further comprising a releasing member, the releasing member having a pivot part, a fixing part and a press part, the pivot part connected to and located between the fixing part and the press part, the pivot part pivotally connected to a side of the second mounting plate, and the fixing part detachably engaged to a side of the electronic device so as to fix the electronic device between the first mounting plate and the second mounting plate.

19. The casing according to claim 18, further comprising an extension spring which is connected to and located between the fixing part and the second mounting plate.

20. The casing according to claim 1, wherein the case body comprises a plurality of side panels, a front panel and at least one fixing piece, the insertion hole is formed on the front panel, the plurality of side panels are respectively connected to different sides of the front panel, the at least one fixing piece is located on one of the plurality of side panels and located above a side of the first mounting plate; when the first mounting plate is in the first mounting position, an end of the first mounting plate away from a first axis of the first mounting plate is engaged to the at least one fixing piece so as to secure the first mounting plate in the first mounting position.

* * * * *